(12) United States Patent
Bain

(10) Patent No.: US 8,489,573 B2
(45) Date of Patent: Jul. 16, 2013

(54) SEARCH ENGINE

(75) Inventor: Simon I. Bain, London (GB)

(73) Assignee: Business Partners Limited, London (GB)

( * ) Notice: Subject to any disclaimer, the term of this patent is extended or adjusted under 35 U.S.C. 154(b) by 0 days.

(21) Appl. No.: 12/922,380

(22) PCT Filed: Mar. 12, 2009

(86) PCT No.: PCT/GB2009/050240
§ 371 (c)(1),
(2), (4) Date: Nov. 16, 2010

(87) PCT Pub. No.: WO2009/112862
PCT Pub. Date: Sep. 17, 2009

(65) Prior Publication Data
US 2011/0055191 A1  Mar. 3, 2011

(30) Foreign Application Priority Data
Mar. 13, 2008 (GB) .................................. 0804695.5

(51) Int. Cl.
*G06F 17/30* (2006.01)
(52) U.S. Cl.
USPC ........... 707/706; 707/707; 707/708; 707/711; 707/765; 707/767
(58) Field of Classification Search
USPC .................. 707/706, 707, 708, 711, 765, 767
See application file for complete search history.

(56) References Cited

U.S. PATENT DOCUMENTS

| 5,987,446 | A | 11/1999 | Corey et al. |
| 8,055,669 | B1* | 11/2011 | Singhal et al. ................. 707/765 |
| 2004/0064447 | A1* | 4/2004 | Simske et al. .................... 707/5 |
| 2006/0069677 | A1* | 3/2006 | Tanigawa et al. ................. 707/4 |

FOREIGN PATENT DOCUMENTS

CN  101136027 A  3/2008

OTHER PUBLICATIONS

Altova GmbH, "Mapforce 2004 and Databases,"User and Reference Manual Mapforce Altova, pp. 67-102 (2004).
Garcia-Molina et al., "Introduction to Physical-Query-Plan Operations." Database Systems Implementation, pp. 257-362 (2000).
Hoong et al., "Guided Google: A Meta Search Engine and its Implementation using the Google Distributed Web Services," retrieved from the Internet on Mar. 9, 2006. Available at URL: http://arvix.org/ftp/cs/papers/0302/0302018.pdf.
International Search Report and Written Opinion for PCT/GB2009/050240, dated Oct. 1, 2009.
Chinese Office Action (Dated Sep. 4, 2012).

* cited by examiner

*Primary Examiner* — Cindy Nguyen
(74) *Attorney, Agent, or Firm* — Howard & Howard Attorneys PLLC

(57) ABSTRACT

A search engine for generating an improved search query, the engine comprising: input means for receiving a search request, the search request comprising N search terms; processing means arranged to formulate a search query from the received search request; output means arranged to output the search query wherein the processing means is arranged to formulate the search query by generating a plurality of search strings, each search string comprising a different combination of a subset of the N search terms.

10 Claims, 14 Drawing Sheets

*Further Example 1*
*BBC + News + Archive European space agency*

*Search Combinations*
    1. BBC News Archive European space agency
    2. BBC News Archive space agency European
    3. BBC News Archive European
    4. BBC News Archive space
    5. BBC News Archive agency
    6. European space agency BBC News Archive
    7. space agency European BBC News Archive
    8. Archive European BBC News Archive
    9. Archive space BBC News Archive
  10. Archive agency BBC News Archive

*Further Example 2*
*BBC + News + Archive + (European OR space OR agency)*

*Search Combinations*
BBC News Archive European
BBC News Archive space BBC
News Archive agency

FIGURE 5b

SELECT XXX FROM YYY WHERE TABLE.FIELD LIKE '%BBC News Archive European space agency %' OR TABLE.FIELD LIKE '%BBC News Archive European %' OR TABLE.FIELD LIKE '%News Archive European space %' OR TABLE.FIELD LIKE '%News Archive European BBC%' OR TABLE.FIELD LIKE '%Archive European space agency %' OR TABLE.FIELD LIKE '%Archive European space News %' OR TABLE.FIELD LIKE '%European space agency %' OR TABLE.FIELD LIKE '%European space agency Archive%' OR TABLE.FIELD LIKE '%space agency%' OR TABLE.FIELD LIKE '%space agency European%' OR TABLE.FIELD LIKE '%British Broadcasting Corporation News Archive European%' OR TABLE.FIELD LIKE '%News Archive European British Broadcasting Corporation%'

FIGURE 6

Result
 Fieldname
  Data
 Fieldname
  Data
 Fieldname
  Data
Result
 Fieldname
  Data

FIGURE 7

XML RESULT 1
```
<result sourceId='accounts'>
    <reference>1234</reference>
    <Company_name>TIA2</Company_name>
    <creditLimit>100,000</creditLimit>
    <lastInvoice>3000.00</lastInvoice>
    <outstanding>3000.00</outstanding>
    <60Days>0.00</60Days>
    <90Days>0.00</90Days>
</result>
```

XML RESULT 2
```
<result sourceId='crm'>
    <reference>1234</reference>
    <Company_name>TIA2</Company_name>
    <Address1>No. 1 Poultry</Address1>
    <Address2>London</Address2>
    <Address3></Address3>
    <Country>UK</Country>
    <postCode>EC2R 8JR</postcode>
</result>
```

XML RESULT 3
```
<result sourceId='crm'>
    <reference>123</reference>
    <Company_name>Total Information Access Ltd</Company_name>
    <Address1>No. 1 Poultry</Address1>
    <Address2>London</Address2>
    <Address3></Address3>
    <Country>UK</Country>
    <postCode>EC2R 8JR</postcode>
</result>
```

FIGURE 8

Arrays with Result 1 values

| Array Number | Node | Value |
|---|---|---|
| Array 1 | reference | 1234 |
| Array 2 | Company_name | TIA2 |
| Array 3 | Address2 | London |
| Array 4 | Postcode | |
| Array 5 | creditLimit | 100,000 |

Checking Result 2 against Arrays

| | True | False |
|---|---|---|
| Array 1 | true | |
| Array 2 | true | |
| Array 3 | | false |
| Array 4 | | false |
| Array 5 | | false |

*102*

Arrays with Result 1 and Result 2 values

| Array Number | Node | Value |
|---|---|---|
| Array 1 | reference | 1234 |
| Array 2 | Company_name | TIA2 |
| Array 3 | Address2 | London |
| Array 4 | Postcode | *EC2R 8JR* |
| Array 5 | creditLimit | 100,000 |

*104*

Checking Result 3 against Arrays

| | True | False |
|---|---|---|
| Array 1 | | false |
| Array 2 | | false |
| Array 3 | true | |
| Array 4 | true | |
| Array 5 | | false |

*106*

Arrays with Result 1, Result 2 and Result 3 values

| Array Number | Node | Value |
|---|---|---|
| Array 1 | reference | 1234, 123 |
| Array 2 | Company_name | TIA2, Total Information Access Ltd |
| Array 3 | Address2 | *London* |
| Array 4 | Postcode | *EC2R 8JR* |
| Array 5 | creditLimit | 100,000 |

FIGURE 10  *108*

```
<?xml version="1.0"?>
<TIA2>
    <Outreach>
        <TIASimplexo>
            <adminAddresses>
                <email>sibain@totalinformationaccess.com</email>
            </adminAddresses>
            <map id='search'>
                <name>search</name>
                <connectionString
type='odbc'>UID=tdz;PWD=tdz;DSN=TENdotZEROServer</connectionString>
                <sql>SELECT DOCUMENTT.documentTitle,
DOCUMENTT.documentAuthor, DOCUMENTT.publishedDate, DOCUMENTT.masterParentFolder,
SEARCHT.documentID FROM DOCUMENTT, SEARCHT WHERE DOCUMENTT.documentID =
SEARCHT.documentID</sql>
                <display
name='Subject'>DOCUMENTT.documentTitle</display>
                <display name='From
Address'>DOCUMENTT.documentAuthor</display>
                <display name='Date'>DOCUMENTT.publishedDate</display>
                <display
name='Folder'>DOCUMENTT.masterParentFolder</display>
                <display name='wordSearch'>SEARCHT.text</display>
                <display name='common'>SEARCHT.documentID</display>
                <display name='bodyText'>SEARCHT.text</display>
            </map>
            <edrmMapping>
                <display name='From Address'>author</display>
                <display name='Date'>modifiedDate</display>
                <display name='Folder'>folder</display>
                <display name='Path'>parentFolder</display>
                <display name='wordSearch'>text</display>
                <display name='common'>documentID</display>
                <display name='bodyText'>text</display>
            </edrmMapping>
        </TIASimplexo>
        <simplexoServers>
            <SimplexoServer name'local'>
                <name>local</name>
                <type>Win</type>
                <webService>true</webService>
                <stayLoggedIn>true</stayLoggedIn>
                <encryptStore>false</encryptStore>
                <homePath>Home</homePath>
                <path>C:/Inetpub/wwwroot/TENdotZERO_WS/</path>
    <address>http://localhost/TENdotZERO_WS/TENdotZERO_WS.asmx</address>
                <serverFolder>/TENdotZERO_WS/</serverFolder>
                <webserver>http://localhost</webserver>
            </SimplexoServer>
        </simplexoServers>
    </Outreach>
</TIA2>
```

FIGURE 11

SEARCH ENGINE

REFERENCE TO RELATED APPLICATIONS

This is the United States National Phase of international patent application PCT/GB2009/050240, filed Mar. 12, 2009, which claims priority to GB 0804695.5, filed Mar. 13, 2008.

TECHNICAL FIELD OF THE INVENTION

The invention relates to an improved search engine. More particularly, the present invention relates to an improved search engine for creating a search query for retrieving stored information from a file index or remote data source and also relates to an improved de-duplication process for removing duplicate entries from received search results.

BACKGROUND TO THE INVENTION

A search engine is an information retrieval system that allows users of a computer system to specify criteria about an item of interest, "search terms", and to have the search engine find the matching items. In the case of text search engine, e.g. Google, the search query is typically expressed as a set of words.

In order to speed up the search process, a search engine will typically collect metadata about the group of items beforehand in a process referred to as indexing. An index typically requires a smaller amount of computer storage and provides a basis for the search engine to calculate the item relevance.

Desktop search is the name given to search tools which search the content of a user's hard drive rather than the Internet. Such tools may find information including web browser histories, email archives, text documents, sound files etc. Such search tools can be extremely fast but may not search the entire hard drive. For example, only operating system specific applications may be searched (e.g. Microsoft documents, folders) and information contained in email or contact databases may not be included.

Since a significant proportion of company data can be stored within unstructured data (e.g. user created directory structures) it is important that a desktop search engine work be able to search within all areas of the computer.

Desktop search engines build and maintain an index database to optimise search performance. Indexing takes place when the computer is idle and the search engine generally collects information relating to file/directory names; metadata such as titles, authors etc; and, the content of the supported data items/documents. An example of a desktop search tool is "Windows Search", an indexed desktop search platform released by Microsoft for the Windows operating platform.

Web search engines provide an interface to search for information on the Internet. A web search engine works by storing information about a large number of web pages which are retrieved by a web crawler, an automated web browser that follows every link it sees. The contents of each page are then indexed and stored in an index database for use in later queries. When a user enters a query into a search engine, e.g. by the use of key words, the web search engine examines its index and provides a listing of best matching web pages according to its criteria. Most search engines support Boolean operators AND, OR and NOT to further specify the search and some engines provide a proximity search which allows users to specify the distance between keywords.

Given the current size and speed of growth of the Internet it is important that the initial search query is relevant in order that relevant search results are returned. The usefulness of a search engine also depends on the relevance of the result set it gives back and one of the main problems with current search engines is the tendency of the results set to contain duplicate search results.

De-duplication of search results is currently handled by means of hash algorithms in which each chunk of data is processed by a hash algorithm thereby generating a unique number which is stored in an index. When a piece of data receives a hash number, that number is compared with the index of other existing hash numbers. If the hash number is already in the index then the piece of data is considered a duplicate and is not stored. Otherwise the new hash number is added to the index and the new data is stored. In some cases, however, the hash algorithm may produce the same hash number for two different chunks of data. When such a hash collision occurs, the system will not store the new data because it sees its hash number already exists in the data index. Such false positives can result in lost data. It is also noted that hash algorithms are complex.

A further drawback of known search engines is a limitation in the types of data source they can search. Traditionally, search engines index and search unstructured data resources. This therefore leaves large amounts of data that is tied into structured data stores, e.g. databases, that cannot be accessed by the traditional search engine. If the structured data is indexed separately then this index may be made available to the search engine but this creates a further data store for data which is already indexed within its own structure.

It is therefore an object of the present invention to provide a search engine that overcomes or substantially mitigates the above problems with the prior art.

STATEMENTS OF INVENTION

According to a first aspect the present invention provides a search engine for generating an improved search query, the engine comprising: input means for receiving a search request, the search request comprising N search terms; processing means arranged to formulate a search query from the received search request; output means arranged to output the search query wherein the processing means is arranged to formulate the search query by generating a plurality of search strings, each search string comprising a different combination of a subset of the N search terms.

The first aspect of the present invention provides a search engine that is arranged to take a search request that has been entered by a user and to re-arrange and mix up the terms contained within the request in order to form a search query (a search query generation engine). It is noted that by splitting up the input search phrase in this way into smaller groupings the search that is performed by the search engine is more likely to return an accurate set of results.

The search query may be output to a local file index, for example if the search engine is part of a desktop PC, or may be output to a server based file index or a remote database.

Preferably each search string comprises a different combination of M search terms, where N>M. Conveniently, the number of search terms in each of the plurality of search strings may vary between 1 and M. It is noted that the search query that is created by the search engine may contain any number of search terms from the input search request.

Optionally, the processing means may be arranged to formulate the search query by determining the combination $^{N}C_{M}$ of search terms, each combination being a different search string. It is noted that this option would ensure that all possible combinations of input search terms are formulated into search queries.

As an alternative to the above formulation of search queries, the processing means may be arranged to formulate the search query based upon predetermined arrangements of search terms for a search request comprising N terms. For example, the search engine may be pre-programmed with a generic format for the search queries for an input search request of a given length N. To take one (non limiting) example by way of explanation, the search engine may receive a search request comprising 6 search terms. It may then look up a number of pre-programmed arrangements of those search terms that should be used whenever the input search request comprises 6 terms. So, one arrangement may comprise terms 1, 3, 5 and 6, another may contain 2, 4 and 6 and so on.

In cases where the search engine comprises predetermined arrangements of search terms, the processing means may be arranged to assign a different identifier to each search term received in the search request and the predetermined arrangements may comprise different arrangements and selections of identifiers.

Optionally, the processing means may be arranged to group two or more search terms together and assign the grouped terms to a single identifier.

Conveniently, where the search terms comprise text, the processing means may be arranged to perform a synonym lookup on the received search terms and additionally may be arranged to substitute any search terms with their synonyms to form additional search strings for inclusion in the search query.

Conveniently, the output means may be arranged to output the search query to a file index comprising an index database of file information and the processing means may be arranged to generate the search query in the form of an SQL query.

Conveniently, the output means is arranged to output the search query to a structured data source. Preferably, where the search query is output to a structured data source, the search engine further comprises a configuration file for the structured data source, the configuration file having connectivity information relating to the structured data source to allow the processing means to generate the search query.

The search engine of the first aspect of the invention may also be conveniently combined with a de-duplication engine which is arranged to remove duplicate search results that are returned as a result of the generated search query. Conveniently, the de-duplication engine is arranged to output a results set to a user and comprises: search result input means arranged to receive a plurality of search results, each search result comprising one or more data items; de-duplication means arranged to remove duplicate search results from the plurality of search results received at the search result input means and to generate a results set; a stored data set comprising one or more data categories and one or more data items distributed throughout the one or more data categories; results set output means arranged to output the results set wherein the de-duplication means is arranged to compare the stored data set to the search results and to determine if a first search result is a duplicate result based on the following criteria: a) if the content of all of the one or more data categories in the stored data set are determined to match data items in the first search result then the first search result is determined to be a duplicate and is discarded; or b) if the content of at least one of the data categories in the stored data set is determined not to match any data items in the first search result then the first search result is added to the results set.

According to a second aspect the present invention provides a search engine for outputting a results set to a user, the search engine comprising: input means arranged to receive a plurality of search results, each search result comprising one or more data items; processing means arranged to remove duplicate search results from the plurality of search results received at the input means and to generate a results set; a stored data set comprising one or more data categories and one or more data items distributed throughout the one or more data categories; output means arranged to output the results set wherein the processing means is arranged to compare the stored data set to the search results and to determine if a first search result is a duplicate result based on the following criteria: a) if the content of all of the one or more data categories in the stored data set are determined to match data items in the first search result then the first search result is determined to be a duplicate and is discarded; or b) if the content of at least one of the data categories in the stored data set is determined not to match any data items in the first search result then the first search result is added to the results set.

As noted above one of the main problems with known search engines is the de-duplication of the results. The second aspect of the present invention provides a mechanism for mechanically removing duplicate results and outputting a results set to a user (also referred to herein as a de-duplication engine). Received search results are compared against a stored data set that comprises one or more data categories. Where the content in the stored data set matches all content items in a given search result that result is deemed a duplicate and is discarded. Where at least some of the content in the stored data set does not match the search result then that search result is deemed to be a new search result and is added to the results set. An output means (results set output means) is then arranged to output the results set (e.g. to a user).

The second aspect of the present invention therefore provides a way of improving the set of search results returned to a user of a search engine.

In a preferred version of this aspect of the invention, the stored data set comprises an array of XML fields ("XML nodes") and the received search results are either in an XML format or are transformed into an XML format. The content of each XML field in the stored array can then be compared to the received search result to determine (i) if the search result comprises that field and (ii) if it does comprise that field, whether the value of that field matches what is already in the stored array.

Preferably, if the first search result is determined to be a new result (i.e. it is not a duplicate) and is added to the results set, the processing means (de-duplication means) may be arranged to add the one or more data items of the first search result to the stored data set. This ensures that as further search results are received they are compared against the data items of all the previous search results to have been received thereby improving the efficiency of the system.

Conveniently, the processing means may be arranged to take each of the plurality of search results in turn and compare them to the stored set of data items in order to determine if each search result is a duplicate result based on the criteria (a) and (b) above.

As noted above, the search results may be received in a format that the search engine can process. In the event that the search results cannot immediately be used however the processing means may be arranged to transform each search result received at the input means into a structured data format comprising one or more data categories, each of the one or more data categories containing a data item. For example, the search results may be transformed into an XML format wherein each data category is an XML field (e.g. an address field) and each data item is the value of that field (e.g. an actual street name or postcode).

Conveniently, the plurality of search results may be received at the input means (search result input means) in the form of a structured data format comprising one or more data categories, each of the one or more data categories comprising a data item.

Preferably, the stored data may be stored in the structured data set format. For example, the stored data set may be an array of XML fields.

Preferably, the stored data set may be in the form of an array table comprising one or more arrays, each array being associated with a data category and the one or more data items being distributed throughout the one or more arrays. For example, the array table may be comprised of a number of arrays (or XML fields).

Preferably, where the stored data is in the form of an array table, the processing means may be arranged to determine if the first search result comprises all of the data categories in the array table and further the processing means may be arranged to add the first result to the results set if any of the data categories in the array table are not present in the first search result.

For a given search result, all the data categories in the array table may also be present in the search result. In such instances the processing means may be arranged to compare the content of each data category in the array table against the content of the corresponding data category in the first search result in order to determine if the first data category is a duplicate result. Conveniently, if, for each and all corresponding data categories, the same data item is present in both the array table and the first search result then the first search result may be determined to be a duplicate result and may be discarded. In this example, the array table and search result may contain exactly the same data categories, e.g. the array table may comprise three categories, Address 1, Postcode and Contact Name, which are also present in the search result. In order to determine if the result is a duplicate the value of the data item in each of those categories may be compared and if the search result comprises values that match a value within the corresponding category in the array table then the search result may be determined to be duplicate.

In the event that any data category in the array table does not match to the corresponding data category in the first search result then the first search result may be determined to be a new result (i.e. not a duplicate result) and may be added to the results set.

Preferably, the processing means may be arranged to take each of the plurality of search results in turn and compare them to the array table in order to determine if each search result is a duplicate result.

Conveniently, search results may be received or transformed into an XML format comprising one or more XML nodes, each of the one or more XML nodes corresponding to a data category.

Conveniently, the stored data set may initially be empty and may be populated with data items common to the first two search results received at the input means. This conveniently allows the search engine to define appropriate data categories on a search-by-search basis.

Alternatively, the stored data set may initially be empty but may comprise pre-defined data categories. In this option, the array table may effectively be predefined before the search is initiated.

Preferably, the search engine may further comprise a configuration file defining a plurality of data categories, the one or more data categories in the stored data set being chosen from the plurality of data categories in the configuration file.

According to a third aspect, the present invention provides a search engine for generating a search query and for processing received search results comprising: a search engine for generating an improved search query according to the first aspect of the present invention; and a search engine for outputting a results set to a user according to any the second aspect of the present invention.

The third aspect of the present invention conveniently provides a search engine that comprises the features of both the first and second aspects of the invention. It is noted that the third aspect of the invention may comprise preferred/optional features of the first and/or second aspects of the invention According to a fourth aspect the present invention provides a method of mapping a data structure of a data source to a predetermined set of data labels, the method comprising: displaying a set of predetermined data labels; displaying the data structure of the data source, the data structure of the data source comprising a plurality of data field names; comparing the set of data labels to the data structure of the data source and identifying data field names that correspond to data labels in the set of predetermined data labels; storing the relationship identified in the comparing step.

In the above aspects of the present invention the search engine may construct a SQL query for a database. In order that the search engine and database are able to interact with each other the fourth aspect of the present invention conveniently provides a method of mapping the data structure of a data source (e.g. a database) to a predetermined set of data labels (e.g. the data labels of the search engine).

Conveniently, the relationships identified in the comparing step may be stored in an XML format. Preferably, the data source may be a database and the relationship may be stored with login information for the database.

The invention also extends to a method of generating a search query and a method of outputting a results set to a user.

The present invention also extends to a computer program when embodied on a record medium/read-only memory/electrical carrier signal or stored in a computer memory, the computer program comprising program instructions for causing a computer to perform the process of the method of the present invention.

BRIEF DESCRIPTION OF THE DRAWINGS

In order that the invention may be more readily understood, reference will now be made, by way of example, to the accompanying drawings in which:

FIG. 5b shows an alternative to FIG. 5a;

FIG. 6 shows an example of an SQL search query constructed from the combinations of FIG. 5;

FIG. 7 shows how search results may be transformed into XML format;

FIGS. 8, 9*a* and 10 show how duplicate search results are removed from the results received by the search engine in accordance with an embodiment of the present invention;

FIG. 11 shows an example of a configuration file that may be used in accordance with an embodiment of the present invention to construct a SQL query;

DETAILED DESCRIPTION

It is noted that throughout the Figures and description below, like numerals are used to denote like features.

Figure 1A:
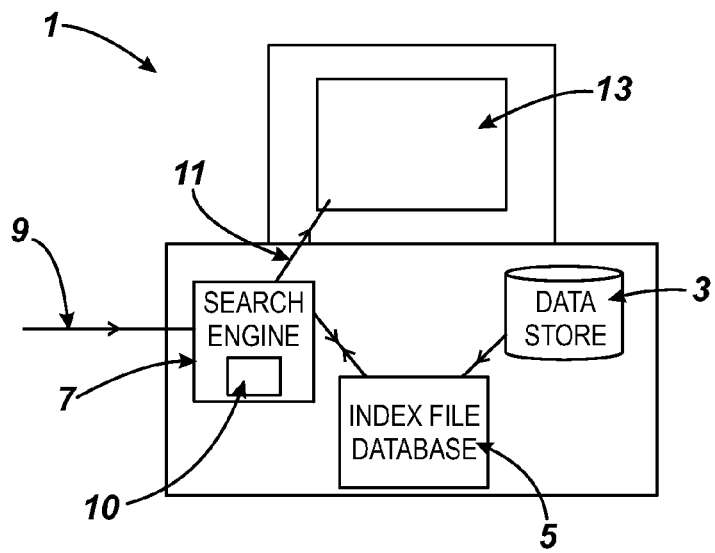
FIG. 1a is a schematic of a desktop version of a search engine in accordance with an embodiment of the present invention.

Turning to FIG. 1*a*, a desktop computer 1 is depicted. The computer 1 comprises a data store 3 (e.g. a hard drive) upon which are stored items of information that a user may wish to search through and an index file database 5 which contains data such as file names, metadata and content information relating to the items of interest in the data store.

A search engine 7 in accordance with an embodiment of the present invention is also provided in the computer 1. The search engine has an input means 9 through which a user may input a number of search terms (for example via entry of text on a keyboard), a processing means 10 for processing received search requests into search queries or de-duplicating received search results (received from, for example, the database 5) and an output means 11 through which a set of search results may be output for display, for example, on a display screen 13 of the computer 1. Upon receiving a search request from a user the search engine 7 communicates with the index database 5, as described in more detail with reference to FIG. 3 below.

Figure 1B:
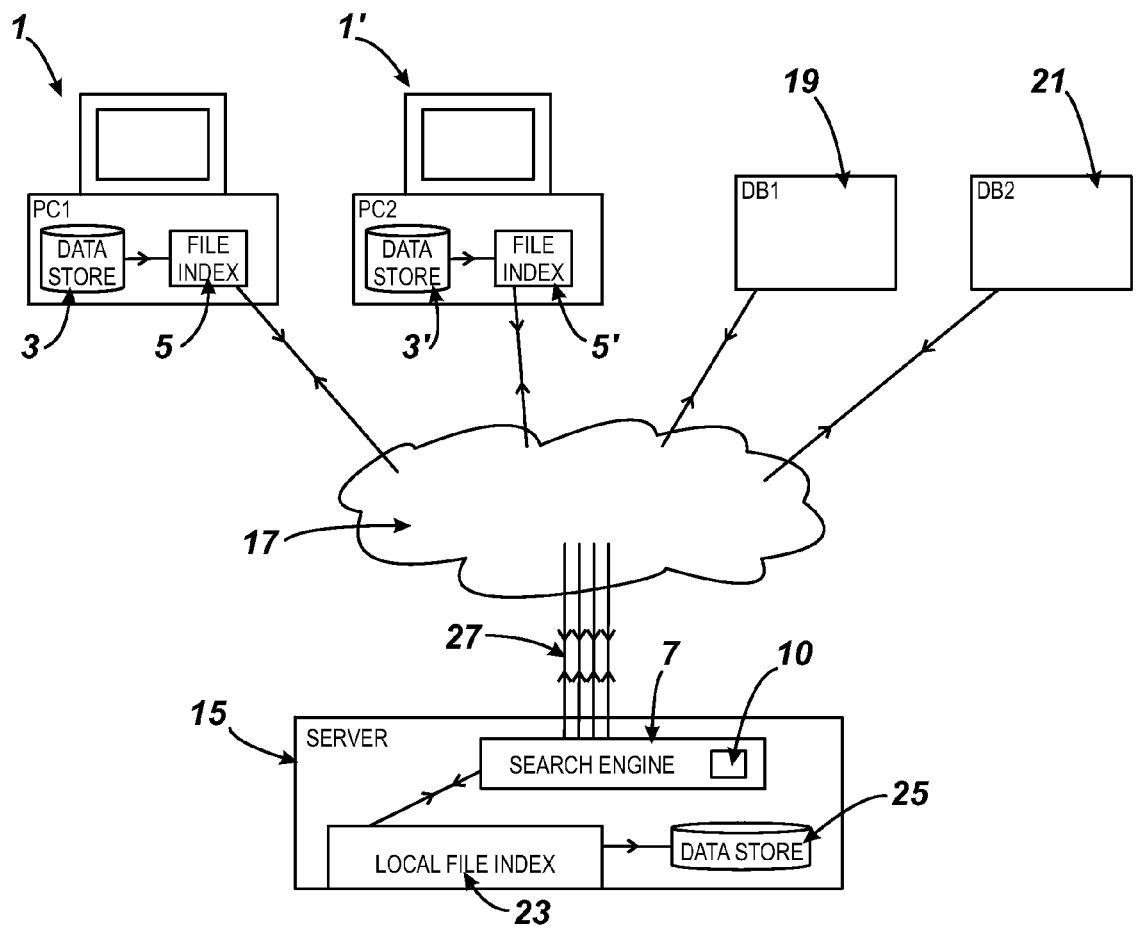
FIG. 1b is a schematic of a server based version of a search engine in accordance with an embodiment of the present invention.

FIG. 1*b* shows a version of the present invention in which a search engine according to an embodiment of the present invention is located on a server computer 15. It is noted that like numerals are used to denote like features between FIGS. 1*a* and 1*b*.

In FIG. 1*b* the server 15 is connected via a telecommunications network 17 (for example the Internet or a local area network) to two desktop computers 1, 1' and two other external data sources (in this case databases 19, 21).

Each desktop 1, 1' comprises a data store 3, 3' and a file index database 5, 5'.

The server 15 comprises a search engine in accordance with an embodiment of the present invention, a local file index 23 and a local data store 25. In use, the server 15 may receive a search request from any connected computer resource 1, 1' via the input/outputs 27. A search query may then be constructed, as described in more detail with respect to FIG. 4 below, and sent to the file indexes 5, 5', 23 and databases 19, 21.

Although the desktop version of the invention is shown connected to a file index database only it is noted that the search engine could also access an external database in a manner similar to that shown in FIG. 1*b*. However, for the purposes of the following description it is assumed that a desktop version searches a file index only and a server version of the search engine searches local and remote file indexes as well as external data sources.

Figure 2:
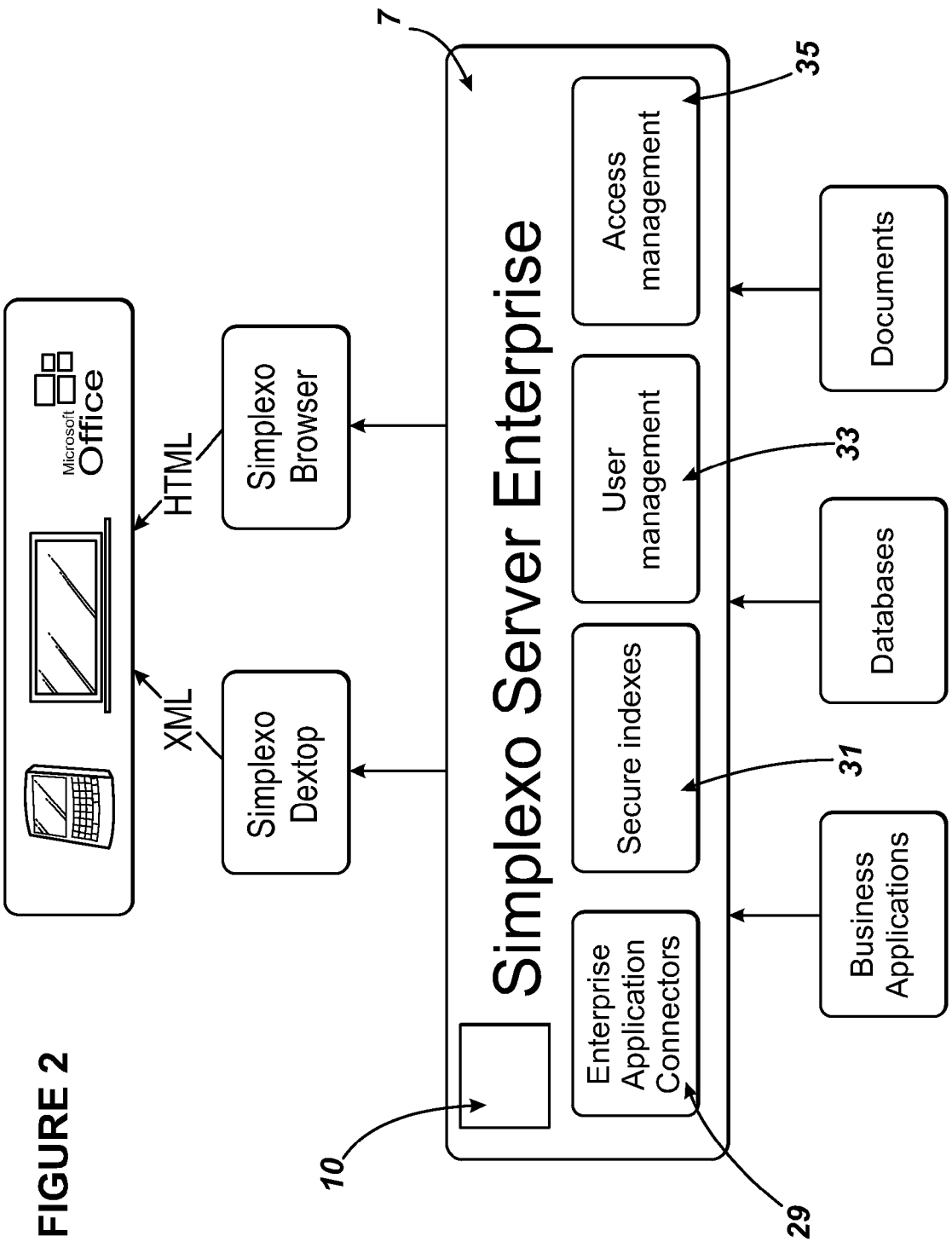
FIG. 2 is an alternative schematic of a search engine in accordance with an embodiment of the present invention.

FIG. 2 shows an alternative schematic for a search engine in accordance with an embodiment of the present invention. As shown in FIG. 2 the search engine 7 is in communication with documents, databases and other applications. The search engine comprises a number of components such as: application connectors 29 for facilitating the interface between the search engine and the applications; secure file indexes 31; and modules for controlling user interaction 33 and access management 35. As noted above in relation to FIGS. 1*a* and 1*b*, the search engine may be embodied on a desktop or may be accessed via a web browser.

It is noted in FIGS. 1*a*, 1*b* and 2 that the processing means 10 is shown as a single component, capable of both generating search queries and de-duplicating received search results. It is however to be appreciated that there may be more than one processing means—for example, one to generate search queries and one to de-duplicate received results.

It is further to be noted that references below to the search engine 7 generating search queries/search term combinations or de-duplicating results into a results set should be understood as meaning the processing means 10 (either single or multiple processing components) within search engine 7 as performing these functions.

Figure 3:
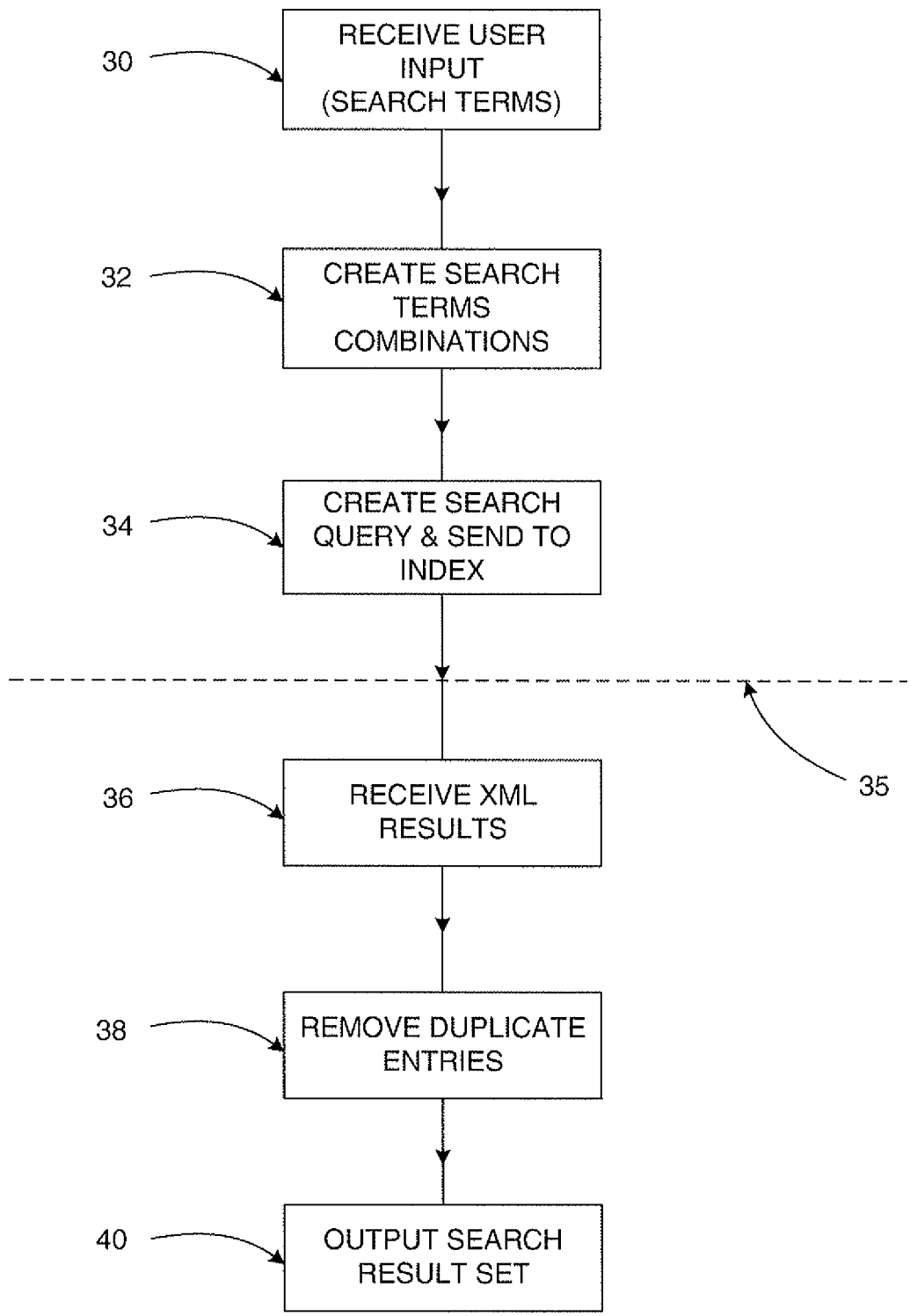
FIG. 3 is a flow chart showing how a search query is created and search results are processed on a desktop computer in accordance with an embodiment of the present invention.

FIG. 3 is a flow chart showing an overview of the search process at a desktop computer 1 comprising a search engine 7 in accordance with an embodiment of the present invention such as that shown in FIG. 1.

At Step 30, the search engine receives via the input means 9 a search request from a user. Such a search request would normally comprise a plurality of text-based search terms (e.g. BBC News Archive European space agency).

Upon receipt of the search terms the search engine 7 creates a number of combinations of a subset of the search terms. For example, in the search request example above there are six separate terms. In Step 32, therefore, the search engine may create a number of groups of up to, for example four words. The creation of such combinations of search terms increases the chances of returning a true set of results. The creation of combinations of search terms is described in greater detail with relation to FIG. 5 below).

In Step 34, the combinations of search terms are combined into a single search query (e.g. in basic SQL format) which can then be sent to the file index database 5. An example of a typical SQL query is shown in FIG. 6*a*.

Steps 30 to 34 (above dotted line 35 in FIG. 3) relate to the generation of an improved search query in accordance with the first aspect of the present invention. Steps 36, 38 and 40 (below dotted line 35 in FIG. 3) relate to the outputting of a results set to the user in accordance with the second aspect of the present invention.

At Step 36, the search engine 7 receives a plurality of search results from the file index 5. These results may be received in XML format or may be transformed into XML format by the search engine as described in relation to FIG. 7 below.

At Step 38 the various elements (or nodes) of the XML results are compared against stored nodes in order to remove duplicate search results. This process is described in detail with reference to FIGS. 8 to 10 below. Unique search results are incorporated into a results set during Step 38 and are then output (at Step 40) to the user.

Figure 4:
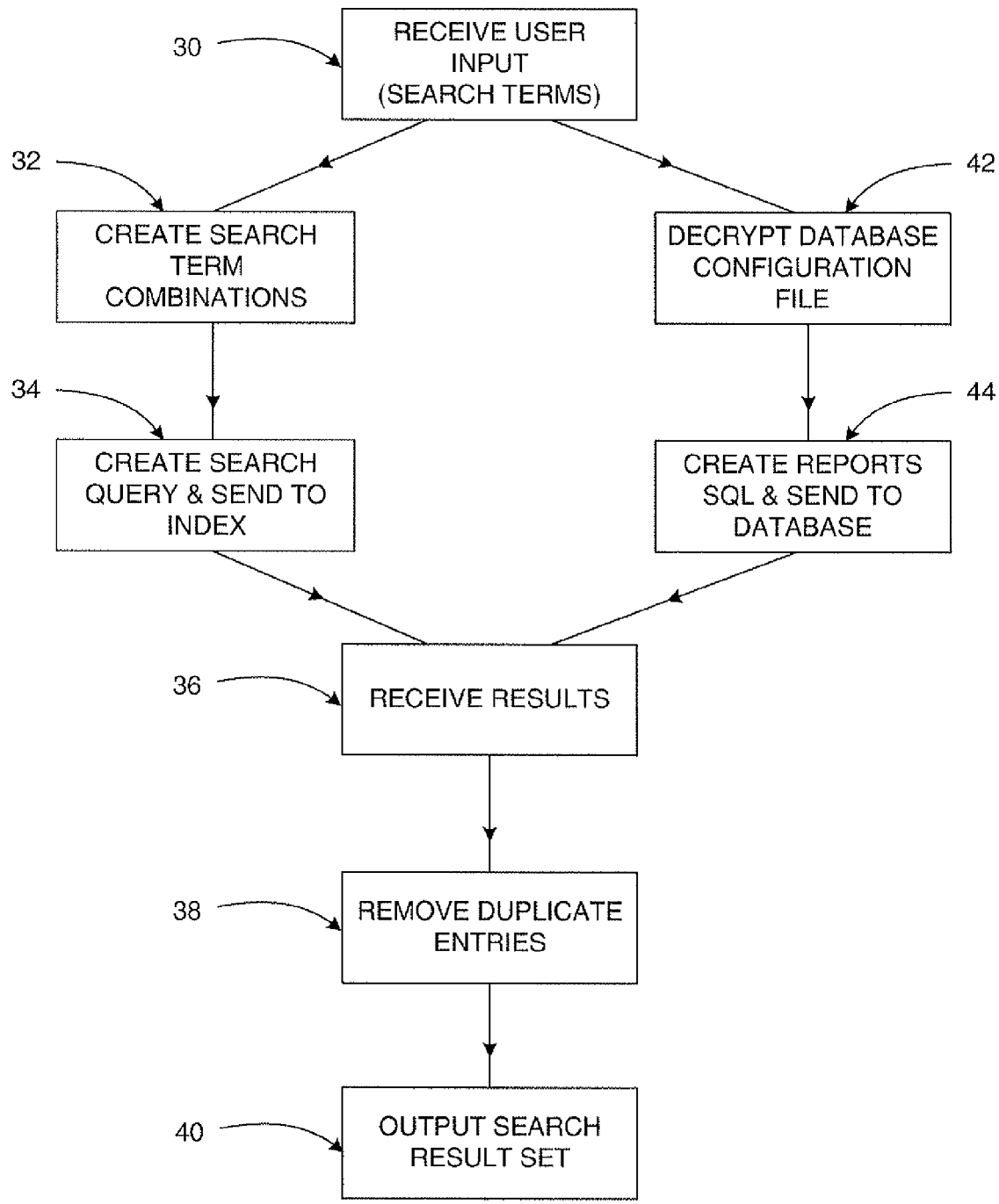
FIG. 4 is a flow chart showing how a search query is created and search results are processed on a server computer in accordance with an embodiment of the present invention.

FIG. 4 is a flow chart showing a similar process to FIG. 3 except in this case the search engine 7 is located on a server 15 and may access data held in an external database 19, 21. Process steps that are the same as FIG. 3 are referred to using the same reference numerals. It is noted that the file index referred to in FIG. 4 may either be a local index 23 on a server or may be a file index 5 held on a remotely located user computer.

Upon receipt of the user input search terms the search engine in FIG. 4 creates search term combinations (Step 32), creates a search query (34), receives search results (Step 36), de-duplicates the results (Step 38) and outputs a result set (Step 40) as per FIG. 3.

However, the receipt of the search terms in Step 30 additionally causes, in Step 42, the search engine 7 to decrypt a database configuration file which stores details of the external database 19, 21 that the search engine can access in order that the search engine can create a database query for the database (in addition to the SQL query for the file index in Step 34).

Following decryption of the configuration file a database reports SQL is created in Step 44 and sent to the data base (an example SQL is shown in FIG. 6). The search engine then moves to Step 36 and the database results are combined with those from the file index and processed in the same way.

Figure 5A:
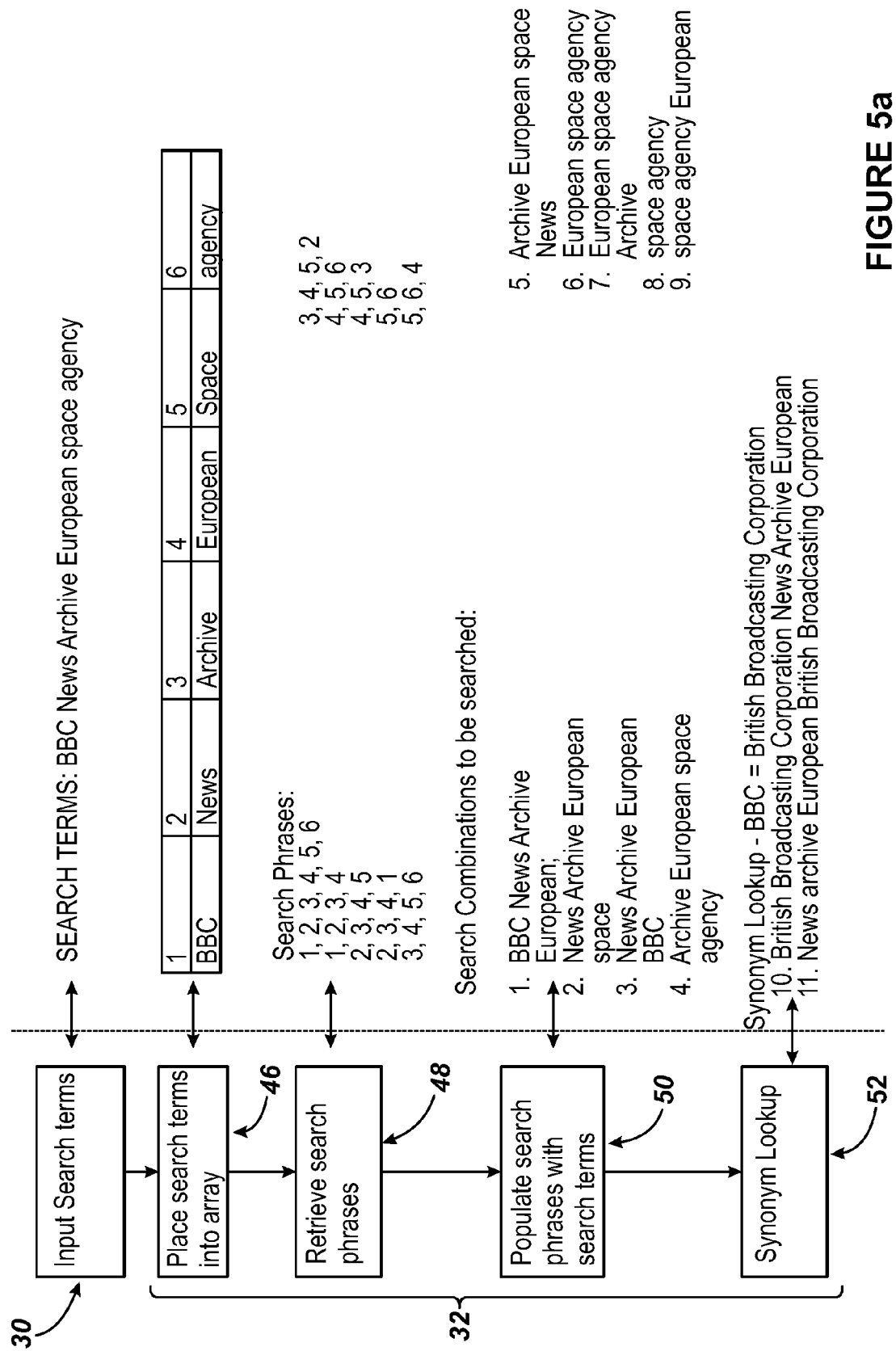
FIG. 5a illustrates how combinations of search terms used to construct a search query are created in accordance with an embodiment of the present invention.

FIG. 5a shows the process of creating various search term combinations in more detail compared to Step 32 shown in FIGS. 3 and 4. Alongside each box of the process depicted in FIG. 5a is a worked example based on the previously mentioned search request of "BBC News Archive European Space agency".

As shown in FIGS. 3 and 4, the user initially, at Step 30, enters his search terms into a display window of the display 13 of his computer. The search engine then, in Step 46, places the search terms into a numbered array such that each search term is associated with its own numerical identifier (in this case "1" through "6").

A stored arrangement of search phrases for an input string of six search terms is then retrieved by the search engine in Step 48 and the current search terms are arranged as per the stored arrangement in Step 50.

The output of Step 50 is nine separate combinations of search terms (nine different search strings) that can be placed into a search query (Step 34 in FIGS. 3 and 4).

Optionally, in Step 52, the search engine 7 may also perform a synonym lookup and create further search combinations based on the lookup results. In this case search combinations 1 and 3 comprise the term "BBC" which can be expanded into "British Broadcasting Corporation" which therefore yields a further two combinations of search terms (two further search strings) which can then be placed into a search query (as per Step 34 in FIGS. 3 and 4).

It is noted that in addition to the process of creating search term combinations as described above, the system according to an embodiment of the present invention may also handle complex search query combinations, for example:

BBC+News+Archive European space agency

In this embodiment the search engine would not arrange to words "BBC News Archive" (and would treat them as a single search term) but would arrange the words, "European", "space" and "agency". This variation of the invention, along with a further variation in which alternate terms are selected, is shown in FIG. 5b.

FIG. 6 shows an example of an SQL query that may be constructed from the eleven search combinations depicted in FIG. 5a.

It is noted that in accordance with embodiments of the present invention the search language used when entering search requests may be configurable based on the user's preferences. For instance, an example of the search language may be:

```
SELECT TEXT='Text to Search'
STARTDATE='A Date'
END DATE='A Date'
AUTHOR='Author Name'
FILENAME='A Filename'
```

In this example the search criteria (which are shown in italics) may be changed to suit a specific organisation's data structures, e.g. AUTHOR may be replaced with CUSTOMERNUMBER.

The output from the SQL query that is sent to the file index/external database is an SQL return. FIG. 7 is an example of the format of such a return for two results. The return may be in an XML compatible format but, in the event that it is not in XML format, may be transformed into XML format in one of the following two ways:

1) For each result in the output, the fieldname data may be normalised to an XML syntax compliant element name; or
2) A mapping file stored on the computer containing the relationships between fieldnames and XML elements may be consulted. The data output in each field may then be mapped to an XML element and added to the output. Each element may then be closed with a tag.

FIG. 8 shows three XML search results that have been received by a search engine in accordance with an embodiment of the present invention. Each XML result comprises a number of classes or nodes, each of which contains (or can contain) search data. It is noted that the XML results of FIG. 8 are an example of the general format shown in FIG. 7.

Taking XML result 1 as an example, the nodes are "reference", "Company_name", "creditLimit", "lastInvoice", "outstanding", "60 Days" and "90 Days".

Each of these nodes is associated with various search data, e.g. the "creditLimit" node contains the value "100,000" and the "outstanding" node contains the value "3000.00".

The process of de-duplication of search results by the search engine will now be described with reference to the flow chart of FIG. 9a and the array tables of FIG. 10.

Figure 9A:
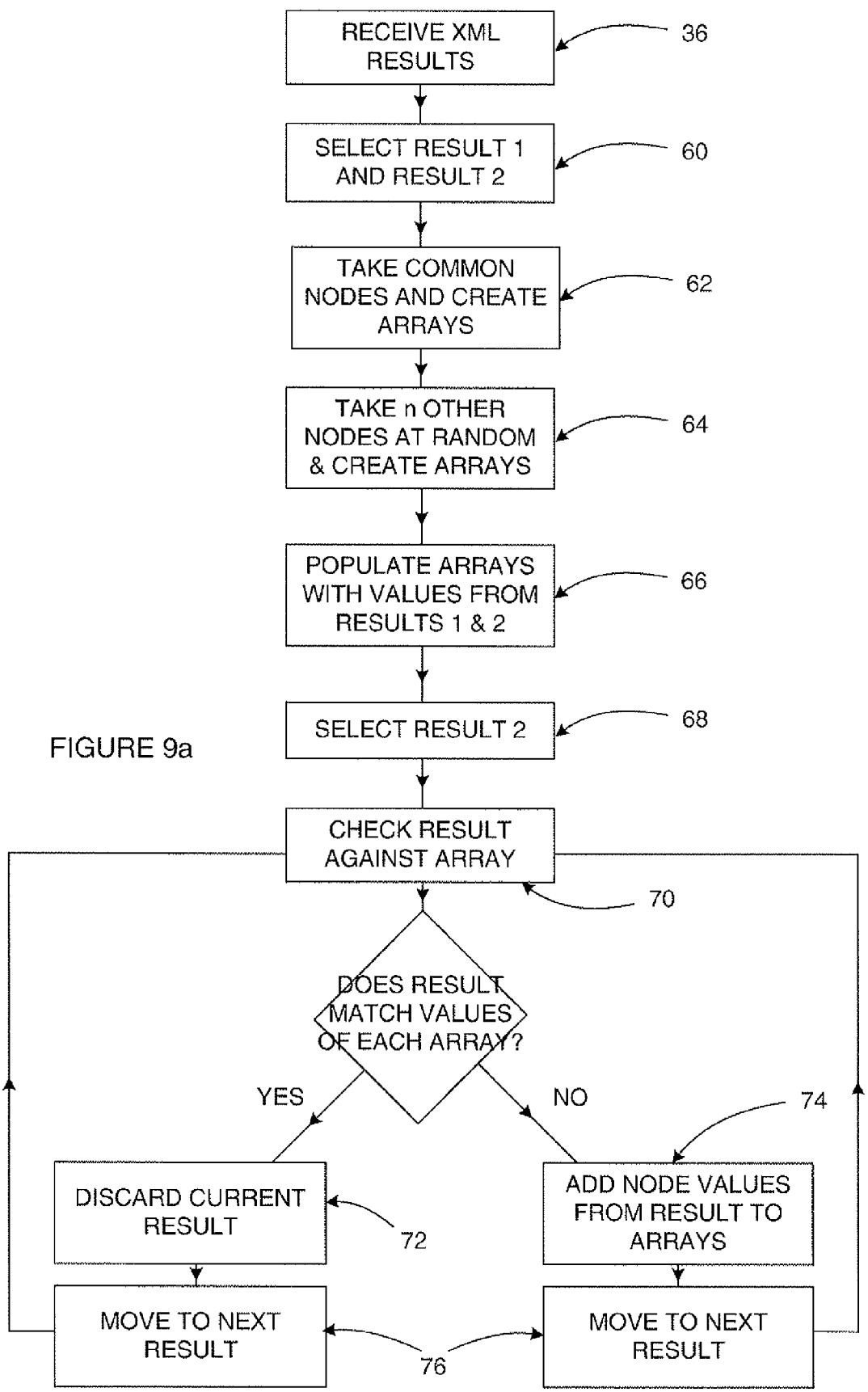

In Step 36 of FIG. 9a, XML search results are received. It is noted that the results may be transformed into XML format as described above in relation to FIG. 7.

At Step 60, the first two XML results are selected and, at Step 62, a common class identified. In this case it is noted that nodes "reference" and "Company_name" are common to the two results and the search engine takes these two nodes and creates two arrays holding the values of these common nodes.

The search engine 7 then chooses, in Step 64, up to three further node identifiers at random from those contained in Result 1 and Result 2 and creates further arrays to these nodes. It is also noted that the search engine may hold a configuration file (as described in relation to FIGS. 11 and 12 below) that details the various node identifiers that are present in the file index/external database and the further node identifiers may be selected from this configuration file. In any case it is noted that the nodes that are present in Results 1 and 2 will be present in any such configuration file.

The outcome of Steps 60, 62 and 64 is the array table 100 shown in FIG. 10. It can be seen in this example that the search engine has chosen the node "Address2" from XML Result 2, node "postcode" from XML Result 2 and node "creditLimit" from XML Result 1. It is noted that the individual search data contained in these nodes in Results 1 and 2 has been added to the array table 100 (Step 66).

It is noted that the number of nodes compared in the de-duplication process may be altered depending on the set up of the search engine or depending on the context of the search. For example, if emails are being searched then the system may be set up such that only a few items of meta-data are searched (e.g. "From", "Date", Subject" "Id" fields). Or possibly only a single meta-data item (e.g. "Id"). By contrast, if an accounting application is being searched then more fields may be appropriate (e.g. "customer", "supplier", "outstanding amounts", "current address", "last order" etc.).

The search engine then begins the process of checking each search result against the array table to determine if the result is a duplicate entry.

Therefore, in Step 68, the search engine takes XML result 2 and, in Step 70, checks its nodes against those contained in the array table 100. Where search data held in each node is a match to the values in the array table, the search engine designates this as "true". Where search data held in each node is not a match to the values in the array table, then the search engine designates this as "false".

The checking function of Step 70 is represented by the array table 102 in FIG. 10 in which it can be seen that the search data of XML result 2 has been matched to Arrays 1 and 2 but not Arrays 3 to 5.

Where the search engine determines that the XML result comprises matching search data for each node in the array table, the result is deemed to be a duplicate and, in Step 72, is discarded.

Where the search engine determines that the XML result does not comprise matching search data for each node in the array table, the result is added to a Results set, in Step 74.

Following Step 72/74, the search engine moves to the next search result (in Step 76) and then cycles back to Step 70 to check the search data held in the nodes of the next search result.

When a search result is added to the Results set, the search data contained within Result 2 is added to the array table. This is shown in array table 104 in FIG. 10 in which the additional search data from Result 2 is shown in italic font and the search data from Step 62 is shown in bold font.

As the process of FIG. 9 is repeated for Result 3, the array table 106 is created at Step 70. It can be seen that Result 3 is not a duplicate result as Arrays 1, 2 and 5 are deemed false.

Since Result 3 is not a duplicate result its search data is added to the array table as previously described above with reference to Result 2. The resultant array table 108 can be seen in FIG. 10 where, in addition to the search data from earlier array table 104, the table now comprises the values "123" in the reference node and "Total Information Access Ltd" in the Company_name node.

Figure 9B:
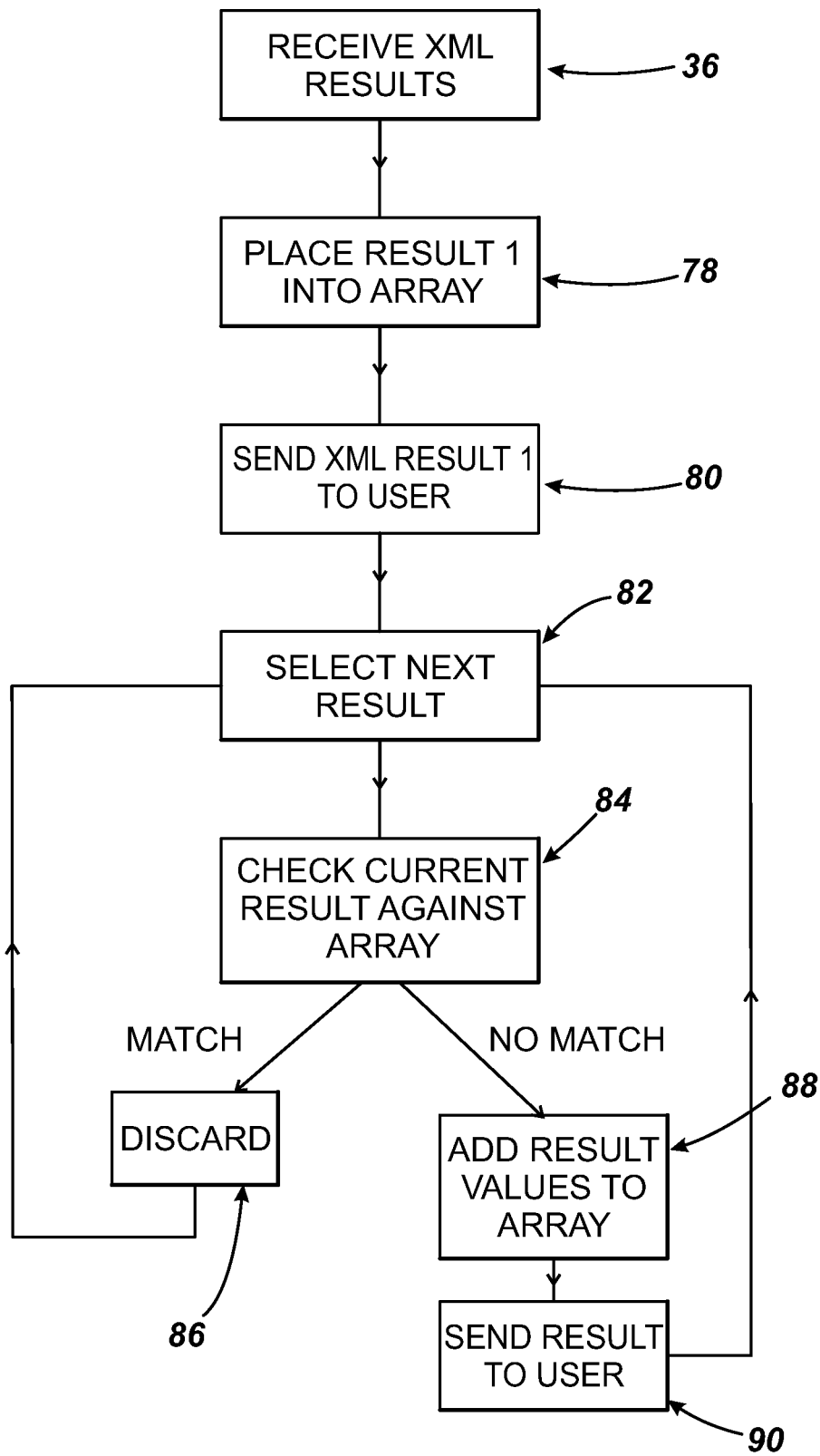
FIG. 9*b* is a flow chart that shows an alternative technique (to that of FIG. 9*a*) for processing the search results in accordance with an embodiment of the present invention.

FIG. 9b is a flow chart that shows an alternative technique (to that of FIG. 9a) for processing the search results in accordance with an embodiment of the present invention. In FIG. 9b the nodes contained within the array table are predefined which means that Steps 60 to 66 shown in FIG. 9a are not required.

Turning to FIG. 9b, the XML search results are received in Step 36.

In Step 78 the values contained within XML result 1 are added to the array table (in so far as there are common nodes). As XML result 1 is the first result it cannot be a duplicate and so in Step 80 is sent to the user.

In Step 82 the next result in the received search results is selected and in Step 84 is checked against the values held in the array table. It is noted that this checking step is the same as described above in relation to FIG. 10.

If all the arrays within the array table return a "true" designation, the result in question is deemed a duplicate and is discarded in Step 86. The search engine 7 then cycles round to Step 82 and selects the next result.

If any array returns a "false" designation then the result is not a duplicate. In Step 88 the values of the current result are added to the array table and in Step 90 the result is forwarded to the user. The search engine then cycles round to Step 82 and the next result is selected.

FIG. 9a therefore shows an embodiment where the array table has been predefined, e.g. by the user, and also shows an embodiment where results are returned as they are processed to the user.

Figure 12:
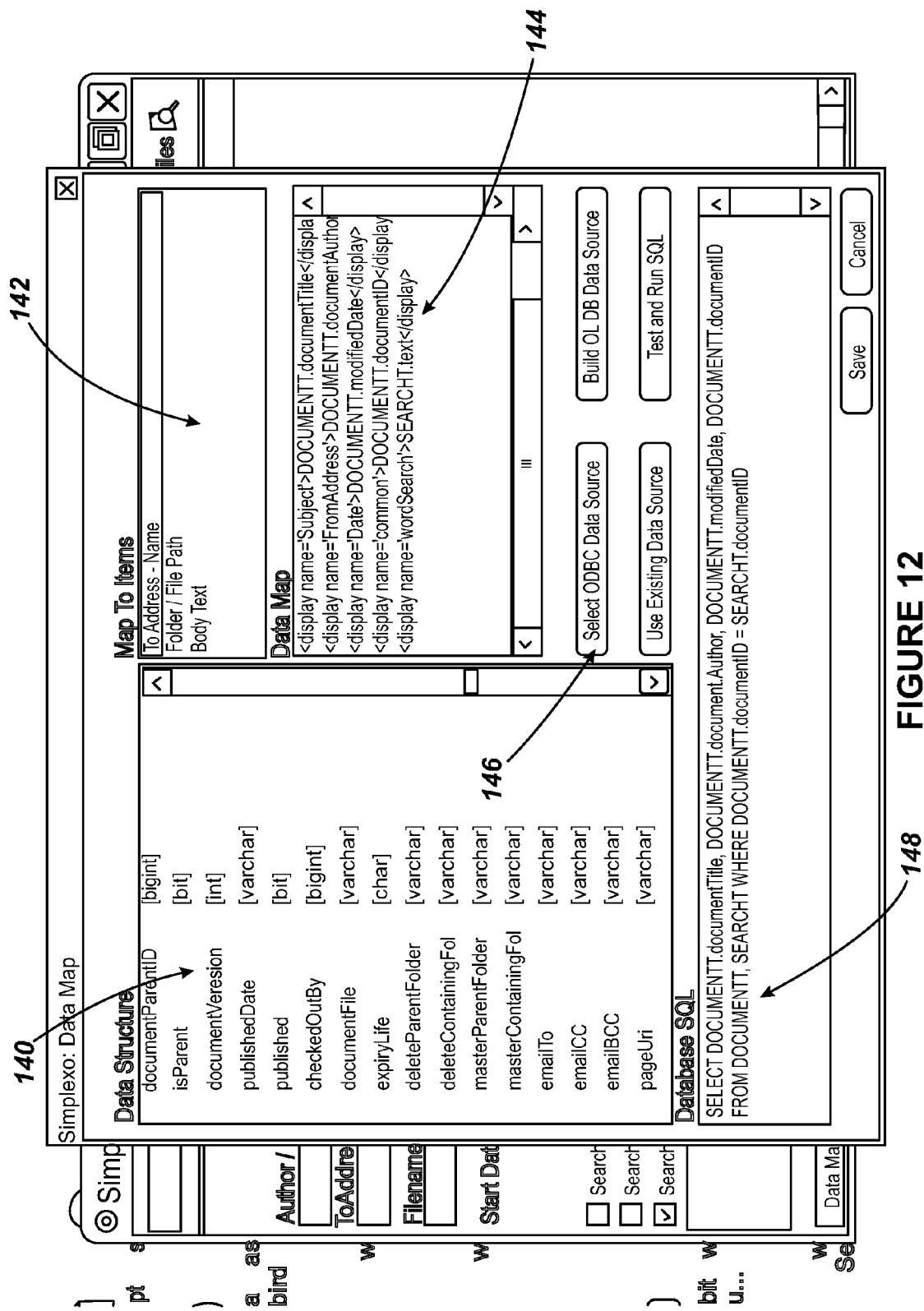
FIG. 12 is a screenshot showing how features of a database may be mapped to features of a search engine in accordance with an embodiment of the present invention.

FIGS. 11 and 12 show, respectively, an example configuration file that may be used by a search engine 7 in accordance with an embodiment of the present invention to construct the SQL query described above and a screenshot of a data mapping function that enables the configuration file to be created.

The configuration file of FIG. 11 may be created by an administrator when the search engine is installed. As can be seen from the Figure, the configuration file is a simple XML file which holds various pieces of information, namely:

1) Database login details (see username 120 and password 122 details);
2) System access levels
3) The mapping relationship between the databases that the search engine accesses to the XML elements used in the de-duplication process—see refernce numeral 124;
4) Initial SQL 126 for the SQL query.

It is noted that in any one configuration file there would be one or more of these database connections.

The mapping relationship is generally shown in region 124 of the configuration file. It is noted that the database fields 128 are shown on the right and the search engine/configuration fields 130 are shown in the left.

The mechanism by which the configuration file is constructed is shown in FIG. 12 which shows the data structure of the database being connected to the search engine, the search engine/configuration field names and the mapping relationship between the data structure and the field names.

In order to set up the mapping within the configuration file, a user displays the data structure of the database in question in window area 140. Configuration field names are displayed in window area 142 and the user selects each field name in turn and then scans the data structure list to identify a corresponding field name. In this manner the relationship of the database to the search engine structure may be mapped and each association may be stored in window area 144.

It is noted that further databases may be added by selecting button 146 and then browsing the computer system for the database in question. User specific SQL commands may be added via window area 148.

It will be understood that the embodiments described above are given by way of example only and are not intended to limit the invention, the scope of which is defined in the appended claims. It will also be understood that the embodiments described may be used individually or in combination.

The invention claimed is:

1. A search engine for generating an improved search query, the search engine comprising:
   an input for receiving a search request, the search request comprising N search terms;
   processor arranged to formulate a search query from the received search request;
   an output arranged to output the search query wherein the processing component is arranged to formulate the search query by generating a plurality of search strings, each search string comprising a different combination of a subset of the N search terms, the plurality of search strings being combined into a single search query the engine further comprising:
a de-duplication engine for outputting a results set to a user, the de-duplication engine comprising:
a search result input component arranged to receive a plurality of search results, each search result comprising one or more data items;
a de-duplication component arranged to remove duplicate search results from the plurality of search results received at the search result input component and to generate a results set;
a stored data set comprising one or more data categories and one or more data items distributed throughout the one or more data categories;
a results set output component arranged to output the results set
wherein the de-duplication component is arranged to compare the stored data set to the search results and to determine if a first search result is a duplicate result based on the following criteria:
a) if the content of all of the one or more data categories in the stored data set are determined to match data items in the first search result then the first search result is determined to be a duplicate and is discarded: or
b) if the content of at least one of the data categories in the stored data set is determined not to match any data items in the first search result then the first search result is added to the results set.

2. A search engine as claimed in claim 1, wherein each search string comprises a different combination of M search terms, where N>M.

3. A search engine as claimed in claim 2, wherein the number search terms in each of the plurality of search strings varies between 1 and M.

4. A search engine as claimed in claim 2, wherein the processing component is arranged to: (i) formulate the search query by determining the combination $^{N}C_{M}$ of search terms, each combination being a different search string; and/or, (ii) formulate the search query based upon predetermined arrangements of search terms for a search request comprising N terms.

5. A search engine as claimed in claim 4, wherein the processing component is arranged when the search query is based upon predetermined arrangements of search terms, to assign a different identifier to each search term received in the search request and the predetermined arrangements comprise different arrangements and selections of identifiers.

6. A search engine as claimed in claim 5, wherein the processing component is arranged to group two or more search terms together and assign the grouped terms to a single identifier.

7. A search engine as claimed in claim 1, wherein the search terms comprise text and the processing component is arranged to perform a synonym lookup on the received search terms.

8. A search engine as claimed in claim 7, wherein the processing component is arranged to substitute any search terms with their synonyms to form additional search strings for inclusion in the search query.

9. A search engine as claimed in claim 1, wherein the output is arranged to: (i) output the search query to a file index comprising an index database of file information and the processing component is arranged to generate the search query in the form of an SQL query, and/or (ii) output the search query to a structured data source.

10. A search engine as claimed in claim 9, further comprising, in the event the search query is output to a structured data source, a data store comprising a configuration file for the structured data source, the configuration file having connectivity information relating to the structured data source to allow the processing component to generate the search query.

* * * * *